United States Patent
Dumitru (10) Patent No.: US 12,386,896 B2
(45) Date of Patent: Aug. 12, 2025

(54) TIME AWARE GRAPHS

(71) Applicant: Dell Products L.P., Round Rock, TX (US)

(72) Inventor: Aurelian Dumitru, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 17/663,493

(22) Filed: May 16, 2022

(65) Prior Publication Data

US 2023/0367813 A1     Nov. 16, 2023

(51) Int. Cl.
     *G06F 16/901*      (2019.01)
     *G06F 16/2458*      (2019.01)

(52) U.S. Cl.
     CPC ...... *G06F 16/9024* (2019.01); *G06F 16/2477* (2019.01)

(58) Field of Classification Search
None
See application file for complete search history.

(56) References Cited

U.S. PATENT DOCUMENTS

| | | | | |
|---|---|---|---|---|
| 2013/0325787 A1* | 12/2013 | Gerken | ................... | G06N 5/048 706/52 |
| 2017/0277769 A1* | 9/2017 | Pasupathy | ............... | H04L 41/22 |
| 2020/0074246 A1* | 3/2020 | Goyal | .................... | G06N 3/084 |
| 2021/0022098 A1* | 1/2021 | Thubert | .............. | H04W 56/004 |
| 2022/0253671 A1* | 8/2022 | Chamberlain | .......... | G06F 17/16 |
| 2023/0153648 A1* | 5/2023 | Ramanasankaran | ... | G06N 3/006 706/12 |
| 2024/0073055 A1* | 2/2024 | Park | .................... | H04L 12/2809 |

OTHER PUBLICATIONS

Https://www.influxdata.com/blog/using-graphql-with-influxdb-and-flux/; Gupta, Jan. 17, 2019.
Https://matteding.github.io/2019/04/25/sparse-matrices/; Apr. 25, 2019.
Https://pypi,org/project/dimpy/, accessed Nov. 11, 2024.

\* cited by examiner

*Primary Examiner* — Tony Mahmoudi
*Assistant Examiner* — Umar Mian
(74) *Attorney, Agent, or Firm* — Workman Nydegger (57) ABSTRACT

A graph is disclosed. A graph includes entities that are represented by N-dimensional matrices. Each of the entities is associated with one or more attributes and each attribute has its own dimension. The graph can represent time aware graph entity changes, time aware graph relationship changes, and supports time aware queries.

18 Claims, 7 Drawing Sheets

TIME AWARE GRAPHS

FIELD OF THE INVENTION

Embodiments of the present invention generally relate to graphs, system representations, and system tools and models. More particularly, at least some embodiments of the invention relate to systems, hardware, software, computer-readable media, and methods for time aware graphs and graph structures.

BACKGROUND

Graphs are conventionally viewed as non-linear data structures that include nodes (vertices) that are connected by edges. Graphs, which are generally directed or undirected in nature, are often used to model connected data. Graphs can describe the current state of a system.

Figure 1A:
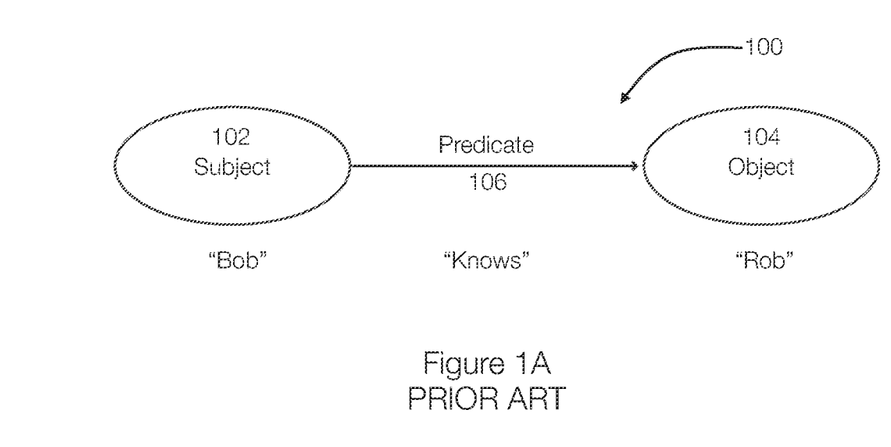
FIG. 1A discloses aspects of an RDF graph.

A common graph standard is a resource description framework (RDF) graph. An RDF graph is often represented using a triplet data model, an example of which is illustrated in FIG. 1A. The graph 100 represents a semantic triplet: subject-predicate-object. In this example, the subject, represented by the node 102, is "Bob". The predicate or relationship represented by an edge 106 is "Knows". The object represented by the node 104 is "Rob". Thus, the graph 100 represents an example of connected data, which is "Bob knows Rob".

RDF graphs are used in part due to the need for interoperability between web-connected devices and/or actors. Standardizing interoperability drove the need for a simple schema and resulted in the subject-predicate-object schema. However, a simplistic model such as RDF can complicate implementation because of the difficulty in representing complex data using RDF graphs. RDF graphs, for example, make the design and implementation of complex operations cumbersome, error-prone, and difficult to scale.

Figure 1B:
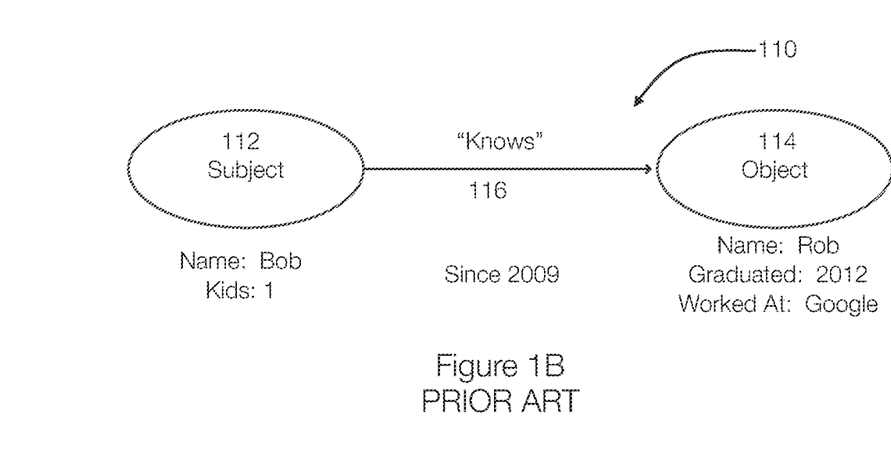
FIG. 1B discloses aspects of a property graph.

Property graphs, such as illustrated in FIG. 1B, add new constructs to RDF graphs. Property graphs add properties, which reduce the complexity of using graphs to model complex operations and systems. The structure of the property graph 110 is similar to the structure of the graph 100: the graph 110 includes a node 112, a node 114 and an edge 116. In this example of FIG. 1B, the node 112 represents a person and is associated with properties of "name" and "kids". The edge 116 is associated with a property of "since 2009" and represents a graph relationship. The node 114 also represents a person and is associated with properties of "name", "graduate", and "worked at". Like the graph 100, the property graph 110 still represents the connected data of "Bob knows Rob", while also modeling additional information.

While property graphs allow complex operations and data to be modelled more effectively, property graphs suffer from a lack of standardization. The node, relationship and property schemas of property graphs vary significantly and, as a result, have not been widely adopted by business users.

Graphs can also be updated over time. Nodes/edges can be added, inserted, amended, or removed. These operations are performed to ensure that graphs represent or model a current state of a system or the current data. However, even if graphs can represent a current state of a system, graphs are unable to provide a chronological view of how the system evolved over time or represent a state of the system in the past. In effect, conventional graphs are not time aware. Although attempts have been made to merge graphs with time series databases, these different data sets are not fully integrated, cumbersome and ineffective. Consequently, data queries are complex and query performance is low.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to graphs, graph models, system, data models, connected data, and/or modelling connected data and systems. More particularly, at least some embodiments of the invention relate to systems, hardware, software, computer-readable media, and methods for time aware graph operations, time aware data models, and time aware connected data. The following disclosure generally refers to these systems, models, and data, which are also time aware, as graphs or time aware graphs.

Embodiments of the invention relate to graphs that can provide a chronological view of how a system (or data) evolved over time and how the system arrived at its current state. Embodiments of the invention allow time-based queries and representations of graph data to be generated.

Graphs are excellent at conveying the state of a system and embodiments of the invention include the ability to construct a view of the system's evolution using graphs. The graphs disclosed herein incorporate time into the graph architecture or structure, which allows the graphs to be time aware and allow graphs to describe or model chronological changes. In one example, a graph can be rolled forward/backward to represent a system state at different points in time. Further, graphs can be used as input to machine learning models to generate inferences that are time aware.

Time is generally orthogonal to conventional graph technologies. At the same time, much of the investment in data is tied to analyzing how a business (or other endeavor) will fare in the near future (e.g., 3, 6, 9, 12 months). Time aware graphs improve the ability of an entity to answer these questions and perform this type of analysis.

Embodiments of the invention relate to a time aware graph architecture that may represent entity event data models to describe the temporal behaviors of a system being modeled. This entity-event graph architecture allows data to be presented in different manners including time aware manners. Embodiments of the invention enable user interactions that use data points that are specific to the user interactions while being able to provide more detailed and deeper views.

While conventional graphs may be described in terms of nodes and edges (or relationships), there is a barrier and a distinction between these elements of conventional graphs. Embodiments of the invention introduce new elements that allow the graph architecture to implement entity-event models and that are distinct from conventional nodes and edges, even if representing the same data.

Generally, graphs as disclosed herein include two types of elements: entities and attributes. Using conventional graph language, nodes and edges or relationships are both examples of entities. Embodiments of the invention remove the barrier between nodes and graph relationships and do not distinguish between nodes and graph relationships. For convenience, however, the terms nodes and edges or graph relationships may be used to convey the relationship of one entity to another entity and to facilitate understanding. However, an entity, regardless of their relationships to other entities, have the same structure. Attributes characterize the entities. Attributes also have structure that is similar to the structure of entities.

In one example, each entity in a graph may be associated with multiple attributes. The entity and the entity's attributes each constitute a dimension. Embodiments of the invention use N-dimensional matrices, instead of subject/relationship/object triplets or property schemas, to model connected data and to create a graph. This is distinct from the associative array-based graph design of conventional graphs and allows support for entity-event data models, which are not supported in conventional graph schemas.

In addition, time is added as a dimension or descriptor to the multi-dimensional space of the graphs. The time descriptor can be represented using characteristics such as trend, cycle, seasonality, and remainder and can be present in each dimension. These characteristics can be embedded into the graph models or more specifically into the entities and attributes.

For example, a graph may be used to model a supply chain system. Adding time descriptors or dimensions to the graph allows a user to illustrate previous iterations of the supply chain process and the evolution of the supply chain process in addition to illustrating the current supply chain process.

Figure 2:
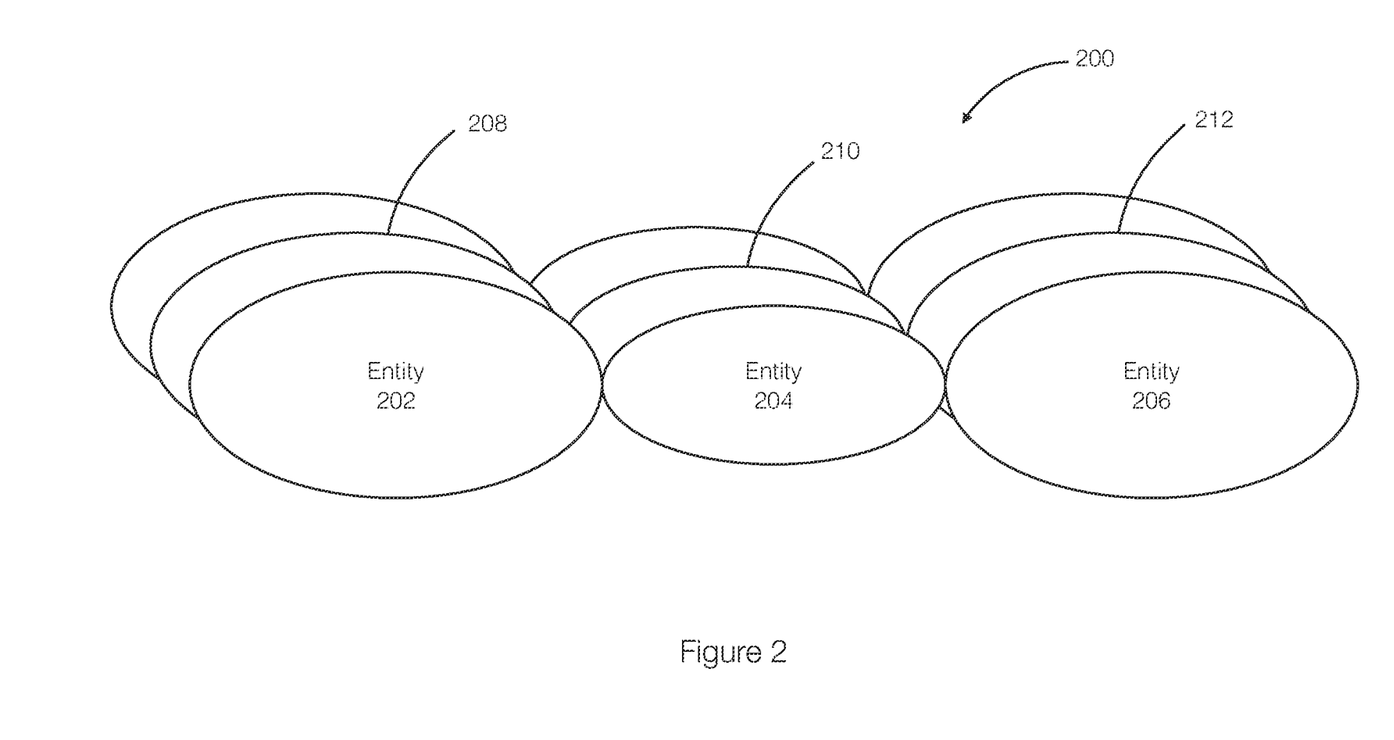
FIG. 2 discloses aspects of time aware graphs that include entity-event associations and data models.

FIG. 2 discloses aspects of time aware graphs. A graph 200, in accordance with embodiments of the invention, includes two element types: entities and attributes. Entities can be used to represent both graph nodes (e.g., entity 202 and entity 206) and their relationships (e.g., entity 204). Attributes, such as attributes 208, 210, and 212, characterize the associated entity. In this example, the attributes 208, 210, and 212 are attributes that characterize, respectively, entities 202, 204 and 206. The relationships are also represented as an entity.

Although FIG. 2 is analogized to conventional nodes and relationships, the graph 200 only includes entities and attributes, which are distinct from nodes and graph relationships. Further, the relationships between the entities of a graph are reflected within the entity's dimensions. As a result, the graph 200 is one of many different visual representations. Using entities and attributes as the building blocks of the graph 200 removes the barrier between graph nodes and graph relationships in conventional graphs. The graph 200 also enables the ability to implement and support an entity-event schema.

More specifically, the structure and organization of the graph 200 may include N-dimensional matrices. The creates the ability to natively model one-to-may relationships without having to duplicate the same relationship properties N-times. Further, the graph 200 can be configured to model temporal behaviors of the system within the N-dimensions of the entities 202, 204, 206 and attributes 208, 210, and 212 included in the graph 200. While the graph 200 illustrates connections between entities in a visual manner, the use of N-dimensional matrices allows multiple connections in matrix form or multi-dimensional form.

Figure 3:
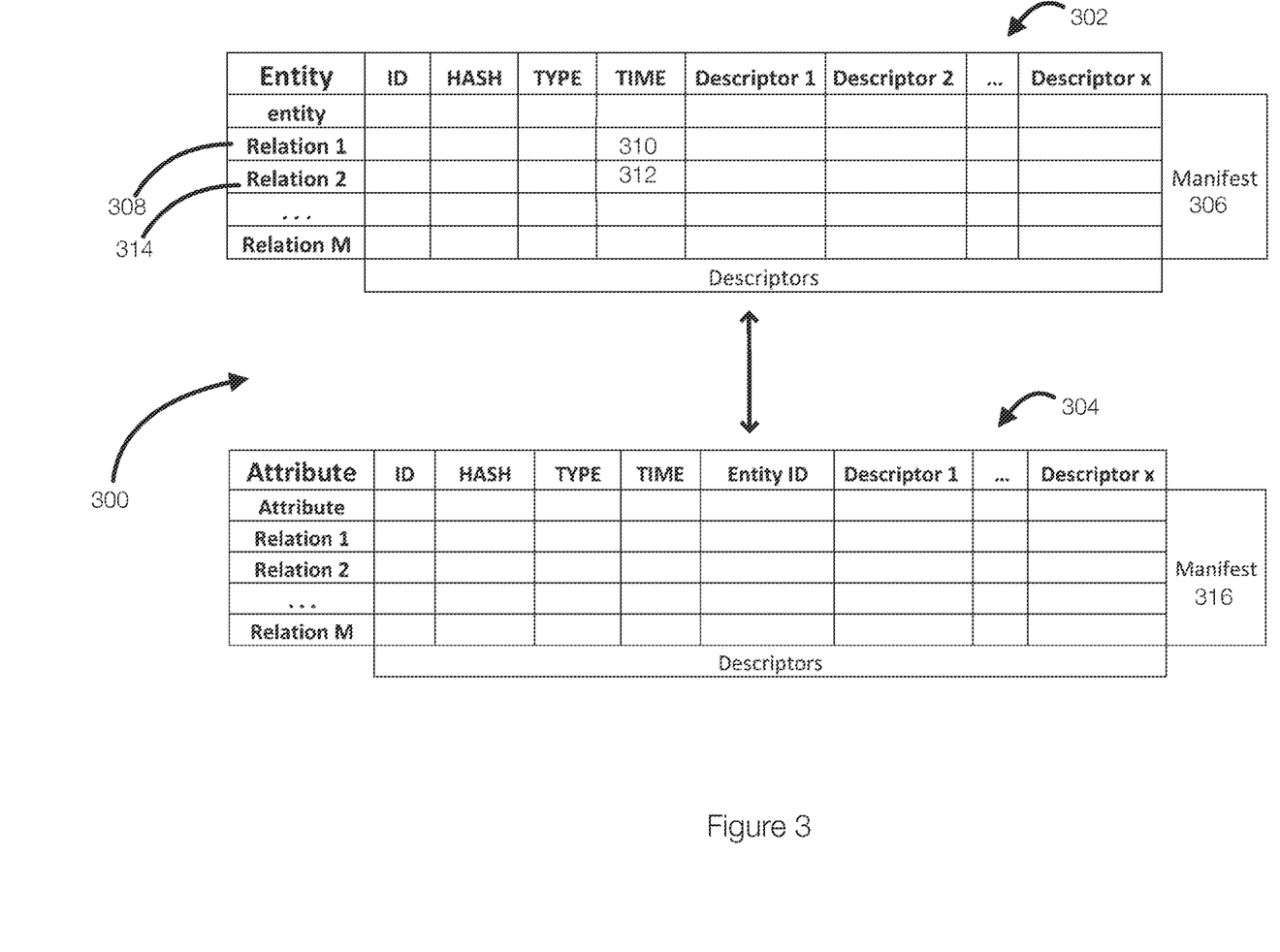
FIG. 3 discloses aspects of an entity in a time aware graph.

FIG. 3 discloses aspects of graphs that include an entity-event model or schema. FIG. 3 illustrates an entity 302 of a graph 300. The entity 302 is associated with a variable number of attributes, represented by the attribute 304. Both the entity 302 and the attribute 304 have their own dimension or dimensions. The entity 302 and the attribute 304 are not required to fit a predefined type and size and can vary in type and/or size. Further, the matrices can be implemented as sparse matrices such as coordinate format (COO) or compressed sparse row (CSR).

The entity 302 includes a manifest 306 that defines or includes parameters of the entity's dimension(s) and their values. The first row of the manifest 306 may be a table of contents with one or more unique identifiers for the entity 302. This may include an identifier (ID), a hash, a type, a time, and descriptors (descriptors 1-x), which are holistically referred to as descriptors.

The next rows in the manifest 306 include dimensions or define relationships between the entity 302 and other entities in the graph 300. Thus, the relation 1 308 identifies a related entity and the row may include the ID, Hash, Type, Time, and descriptors for that related identity. The manifest 306 allows the entity 302 to be associated with other entities (e.g., nodes, relationships, clusters of nodes, external graphs, or the like or any combination thereof). The manifest 306 may identify multiple related entities.

Because nodes and graph relationships are examples of entities and because embodiments of the invention do not distinguish between nodes and relationships, entities (whether viewed as a node or a relationship for descriptive purposes) can be traversed using the same models and queries at least because they have the same structure. In other words, the entity 302, if compared to conventional graphs, can be either a node or a relationship by way of example. In either case, the entity 302 can be traversed or queried in a similar manner as other entities.

The inclusion of a time descriptor in the entity 302 allows the associated graph 300 to be time aware of entity changes or other events. Entries in the time descriptor may include a timestamp. In one example, the timestamp used in the entity dimensions and the attribute dimensions have the same specificity. For example, all time entries have the specificity, by way of example only, of day, or day/hour or day/hour/second, etc. This allows events to be ordered within the graph 300 and facilitates entity-event data modelling.

In one example, the time entry in the time descriptor may reflect the most recent event or change. Alternatively, or in addition, a history of times (e.g., timestamps) may be maintained or stored such that the state of the graph (or entity or group of entities) can be viewed from any point in time desired by a user. This allows the evolution of the graph to be generated, analyzed, or viewed. For example, the data stores modeled or represented in the graph 300 can be queried using a query configured to generate a time series or a plot, a time dependent view, a time-based comparison, an inference, or the like. The state of a system modeled by the graph 300 at time t, for example, can be compared to the state at time t+n. The time descriptor allows events in the system to be organized in a time-ordered manner. This allows the evolution of the graph (or of the system/data modelled by the graph) to be viewed and/or queried.

For example, a time entry 310 identifies a temporal aspect of an event that may be relevant to the entity 302 and the entity represented by the relation 1 308. The time entry 310 may be independent of events between the entity 302 and other entities in the manifest 306. If a time entry 312 identifies another event between the entity 302 and the entity associated with relation 2 314, the time descriptor allows the graph 300 to present a time-aware relationship.

For example, the ability to insert time into the graph 300 allows an evolution of a system to be determined. For example, the entities in the graph 300 may illustrate that graduates of school X join company B within z days of meeting with a specific recruiter R. Rather than simply showing which graduates are associated with which recruiter, a time aware graph can provide insight into how fast a recruiter is able to recruit or how many contacts with a recruit are usually needed before a recruit is hired. Without this time aware information, the graph 300 would be unable to provide this insight into the evolution of hiring practices. Similarly, time aware graphs may be able to illustrate the evolution of how certain changes or groups of changes to a product correspond to increased (or decreased) sales of that product.

In one example, the time dimension allows the graph to be time aware with respect to entity changes. If the entity 302 represents a person or node (John Smith), the entity 302 could represent that John Smith received a 10% salary increase (represented as an attribute of the node or entity) on Oct. 1, 2020 (represented as a graph timestamp in the time descriptor).

In another example, the time dimension allows the graph to be time aware with respect to relationship changes. If John Smith (an entity or node) joined (represented as a graph relationship) software engineering (another entity or node) on Jan. 1, 2021, the timestamp corresponds to a graph relationship.

In another example, the time dimension allows graph to support time-aware queries. For example, how will product X perform in Market Y if competitor Z adds functionality a, b, c to their existing offering in the next 6 months.

The entity 302 may also be associated with an attribute 304. The attribute 304 is linked to its parent entity 302 in the first row of the manifest 316 in the entity ID field. Each of the relations in the manifest 316 of the attribute 304 characterize the entity 302. The other rows in the manifest 316 may link the attribute 304 to other entities.

In one example, the attribute 304 does not require an additional linkage table at least because the manifest 316 includes an entity id descriptor. This allows each relation to be related to a specific entity, which may be distinct from the entity characterized by the attribute 304. Further, the number of descriptors in any given dimension may be variable and need not be the same for each entity/attribute.

Figure 4:
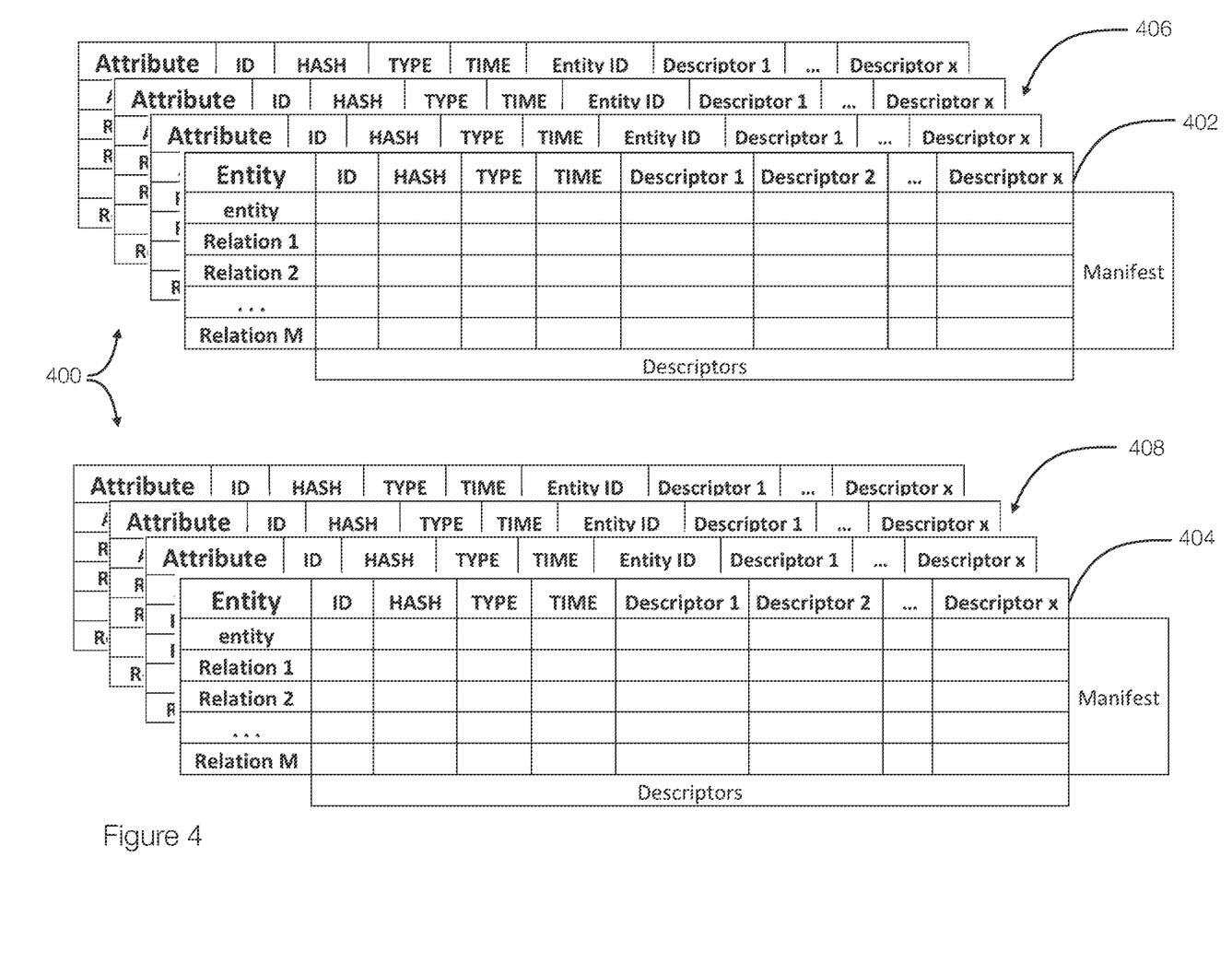
FIG. 4 discloses additional aspects of entities and attributes in a time aware graph.

FIG. 4 illustrates another example of entities of a graph. The graph 400 includes multiple entities, represented by the entities 402 and 404. The entity 402 is characterized by the attributes 406 and the entity 404 is characterized by the attributes 408.

In one example, many changes or events that occur to a parent entity come from the attributes. Because the attributes are separated into their own dimensions, this facilitates an entity-event model as events can be recorded with respect to specific attributes and/or entities. Stated differently, changes to an entity over time can be characterized as events that are implemented as attribute changes over time.

The entities and attributes of a graph may be synchronized to facilitate reporting and predictive exploration. Synchronization may ensure that the events can be ordered and/or that the time descriptors share the same specificity.

Figure 5:
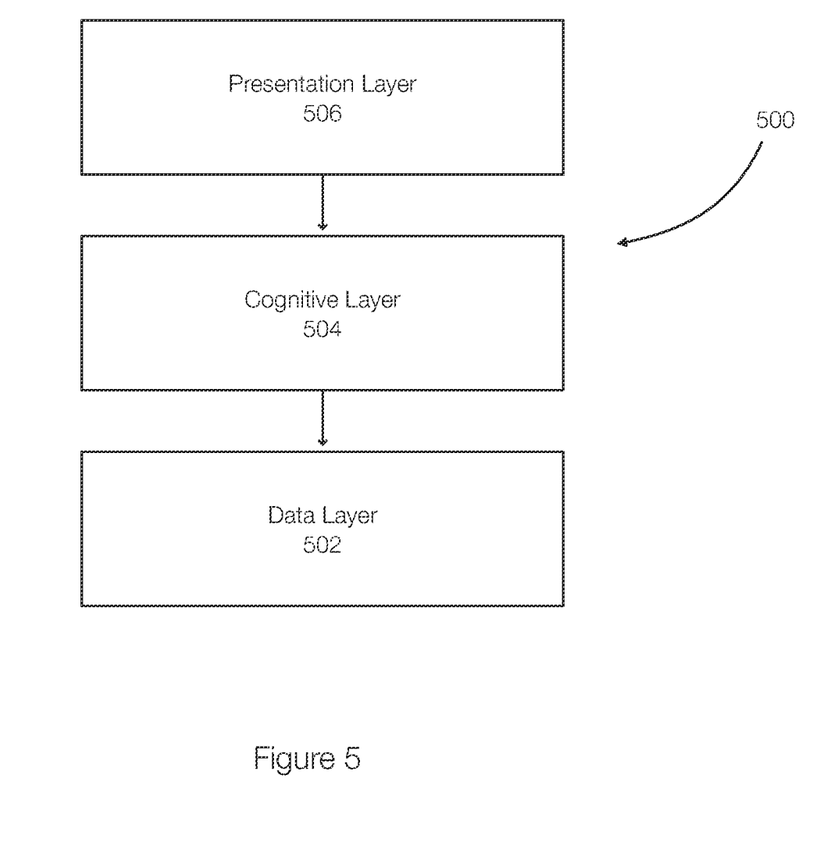
FIG. 5 discloses aspects of graph implementation in a computing system.

FIG. 5 discloses aspects of a technical implementation of graphs. The architecture 500 includes a data layer 502. The data layer 502 may include a graphs store for storing graphs, other databases such as MongoDB or Riak, and/or a feature store. Graphs may be stored in the graphs store.

The feature store allows features to be shared with multiple inference models. This avoids duplication of training pipelines and allows features to be defined a single time. Once features are defined, the features can be calculated, and the values shared across both production and training environments. The training environments allows models to be trained using historical models and the production environment allows inferences to be generated with fresh feature values.

The cognitive layer 504 includes a library of functions and models used for analytics and inference. The cognitive layer 504 may also be used for machine learning and for the development of new functions.

The presentation layer 506 serves as an interface between the graphs and a user. The presentation layer 506 may support human commands, natural language processing, natural language understanding, natural language queries, other query language such as GraphQL, and other interface calls such as REST (representational state transfer) or the like or combinations thereof.

Figure 6:
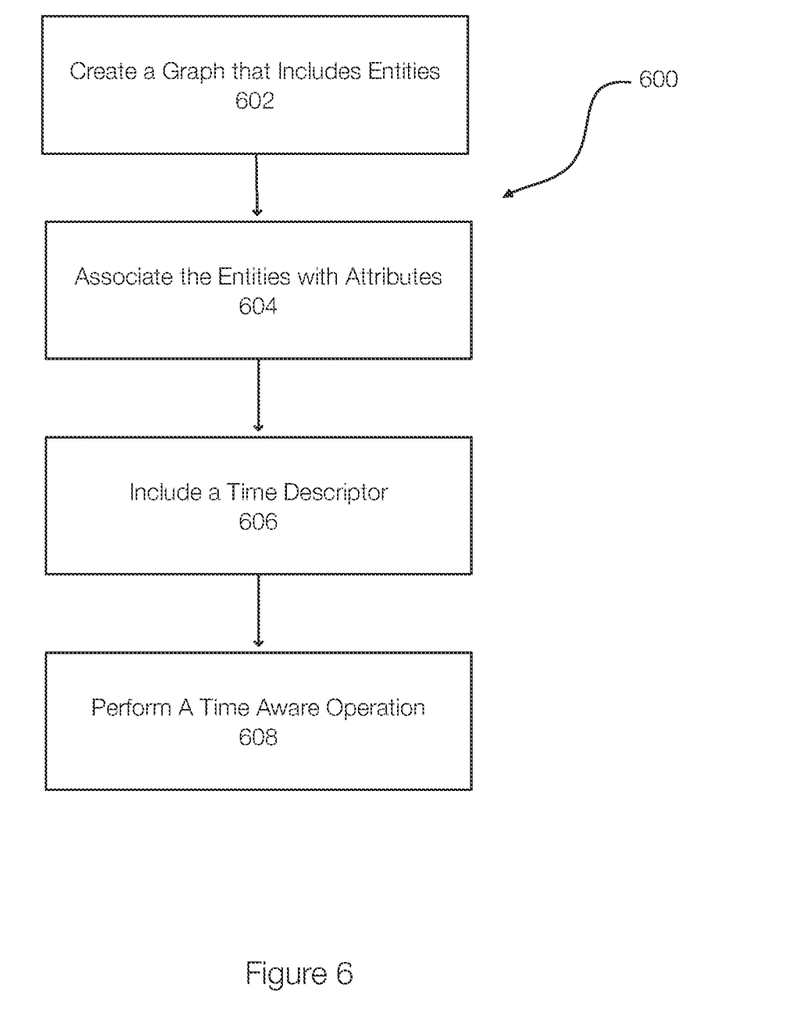
FIG. 6 discloses aspects of operations in a time aware graph.

FIG. 6 discloses aspects of a method for performing graphing operations. In the method 600, a graph may be created 602 to include one or more entities. Entities are able to represent nodes, relationships, or the like and have the same or similar structures. Each of the entities may be associated 604 with attributes, which are configured to characterize the entities. The graph, which includes entities/attributes, allows distinctions between graph nodes and graph relationships to be removed. This makes it easier to search the graph because each entity has the same structure. The dimensionality of the graph and the separation of attributes into their own dimensions facilitates time aware operations. For example, the impact of an event can be specific to one or more attributes and one or more entities. When an event occurs with respect to an entity, the event may be reflected in a particular attribute and may be timestamped. This allows searches to be made such that events can be ordered by time.

When creating the graph, time descriptor is included 606 in each of the attributes and in each of the entities. In some examples, multiple time descriptors may be provided. The time descriptors may store timestamps, histories of timestamps, or the like and may all have the same specificity such that events can be ordered chronologically based on the time descriptor. The time descriptor also allows the state of the system to be viewed at different points in time and from the perspective of different attributes and/or entities.

Next, time aware graph operations may be performed 608. This may include creating a graph and instantiating entities/attributes/outputting time aware outputs in response to a query, inputting time aware data (e.g., a time aware graph)

into a machine learning model to generate inferences, presenting chronological view(s) of a system, generating views of a system's evolution over time, generating notifications that are based on time aware graphs, or the like. Some of these may be presented in visual form in a user interface. The user interface may be interactive and allow input to drill down or out of the graph.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, graph operations, search operations, graph analytic operations, entity/attribute operations, time aware operations in graphs, or the like.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Rather, such principles are equally applicable to any object capable of representing information. Embodiments of the invention further relate to graphs, graph data structures or the like.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: creating a graph that includes entries, wherein each entry comprises a dimension, associating each of the entries with an attribute, wherein each of the attributes comprises a dimension and is configured to characterize an associated entry, including a time descriptor in each of the entries and in each of the attributes, and performing a time aware operation on the graph to generate an output that is time aware.

Embodiment 2. The method of embodiment 1, further comprising implementing an entity-event model in the graph.

Embodiment 3. The method of embodiment 1 and/or 2, further comprising synchronizing time across all dimensions of the graph.

Embodiment 4. The method of embodiment 1, 2, and/or 3, wherein synchronizing time avoids time expansion, time contraction and time drift in the graph.

Embodiment 5. The method of embodiment 1, 2, 3, and/or 4, further comprising generating an evolution that demonstrates a development of a system represented by the graph.

Embodiment 6. The method of embodiment 1, 2, 3, 4, and/or 5, wherein each of the entities and each of the attributes is implemented as a collection of vectors using a coordinate format or a compressed sparse row.

Embodiment 7. The method of embodiment 1, 2, 3, 4, 5, and/or 6, further comprising generating time aware graph entity changes based on the time descriptors of the entities and/or the time descriptors of the attributes.

Embodiment 8. The method of embodiment 1, 2, 3, 4, 5, 6, and/or 7, further comprising generating aware relationship changes based on the time descriptors of the entities and/or the time descriptors of the attributes.

Embodiment 9. The method of embodiment 1, 2, 3, 4, 5, 6, 7, and/or 8, further comprising performing time aware queries based on the time descriptors of the entities and/or the time descriptors of the attributes.

Embodiment 10. The method of embodiment 1, 2, 3, 4, 5, 6, 7, 8, and/or 9, wherein the time descriptor in each of the attributes and each of the entities has a same specificity.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
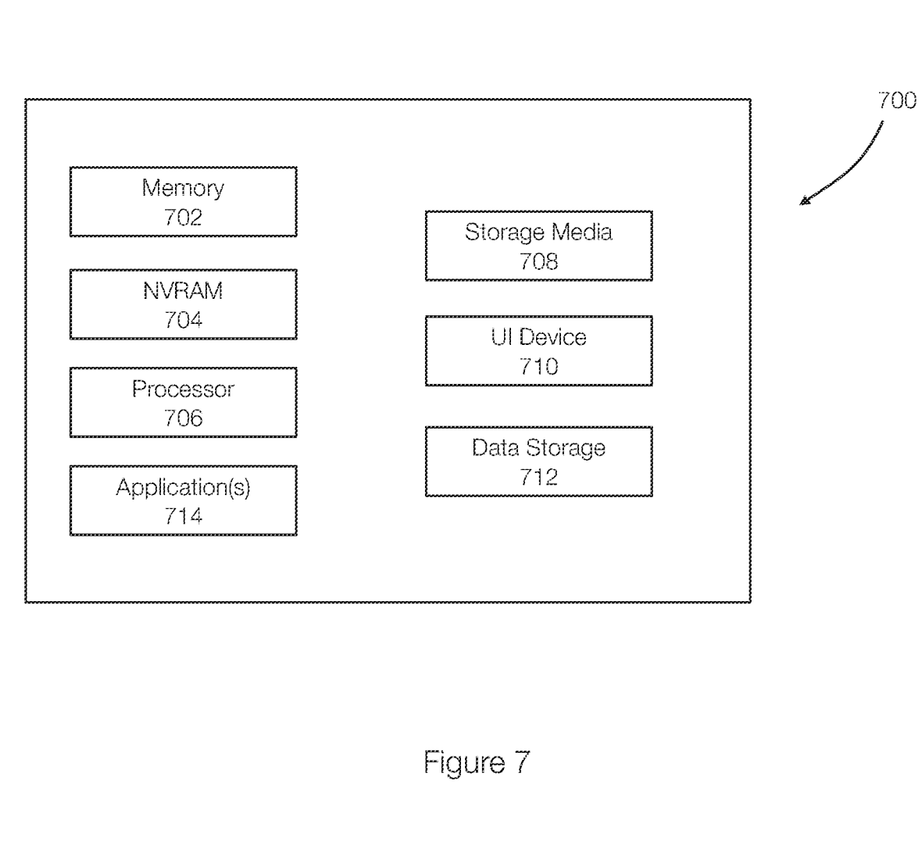
FIG. 7 discloses aspects of a computing device, system, or entity.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating a graph that comprises entities, wherein each entity is configured to be directly associated with other entities, and wherein each entity has a same structure that includes an N-dimensional matrix, wherein each of the entities is associated with an attribute having a structure that includes an N-dimensional matrix, wherein the N-dimensional matrices of the entities allow multiple direction connections to other entities in the graph in multi-dimensional form,
    wherein each of the attributes comprises a dimension and is configured to characterize an associated entity;

including a time descriptor in each of the N-dimensional matrices of the entities and in each of the N-dimensional matrices of the attributes; and performing, by a model, a time aware operation on the graph to generate an output that is time aware, wherein the output includes an inference based on the graph, wherein the time descriptors each include data that have specificity and allow events to be ordered by time to facilitate entity-event modeling, wherein the time aware operation includes querying the entities of the graph and ordering the events based on the time descriptors, wherein all the entities in the graph are configured to be queried in a similar manner.

2. The method of claim 1, further comprising implementing an entity-event model in the graph to perform the entity-event modeling.

3. The method of claim 1, further comprising synchronizing time across all dimensions of the graph based on the data in the time descriptors.

4. The method of claim 3, wherein synchronizing time avoids time drift in the graph.

5. The method of claim 1, further comprising generating an evolution that demonstrates a development of a system represented by the graph.

6. The method of claim 1, wherein each of the entities and each of the attributes is implemented as a collection of vectors using a coordinate format or a compressed sparse row.

7. The method of claim 1, further comprising generating time aware graph entity changes based on the time descriptors of the entities and/or the time descriptors of the attributes.

8. The method of claim 1, further comprising generating time aware relationship changes based on the time descriptors of the entities and/or the time descriptors of the attributes.

9. The method of claim 1, further comprising performing time aware queries based on the time descriptors of the entities and/or the time descriptors of the attributes.

10. The method of claim 1, wherein the time descriptor in each of the attributes and each of the entities has a same specificity.

11. A non-transitory storage medium having stored therein instructions that are executable by one or more hardware processors to perform operations comprising:

generating a graph that comprises entities, wherein each entity is configured to be directly associated with other entities, and wherein each entity has a same structure that includes an N-dimensional matrix, wherein each of the entities is associated with an attribute having a structure that includes an N-dimensional matrix, wherein the N-dimensional matrices of the entities allow multiple direction connections to other entities in the graph in multi- dimensional form,;

wherein each of the attributes comprises a dimension and is configured to characterize an associated entity;

including a time descriptor in each of the N-dimensional matrices of the entities and in each of the N-dimensional matrices of the attributes; and performing, by a model, a time aware operation on the graph to generate an output that is time aware, wherein the output includes an inference based on the graph, wherein the time descriptors each include data that have specificity and allow events to be ordered by time to facilitate entity-event modeling, wherein the time aware operation includes querying the entities of the graph and ordering the events based on the time descriptors, wherein all the entities in the graph are configured to be queried in a similar manner.

12. The non-transitory storage medium of claim 11, further comprising implementing an entity-event model in the graph to perform the entity-event modeling.

13. The non-transitory storage medium of claim 11, further comprising synchronizing time across all dimensions of the graph based on the data in the time descriptors.

14. The non-transitory storage medium of claim 13, wherein synchronizing time avoids time drift in the graph.

15. The non-transitory storage medium of claim 11, further comprising generating an evolution that demonstrates a development of a system represented by the graph.

16. The non-transitory storage medium of claim 11, wherein each of the entities and each of the attributes is implemented as a collection of vectors using a coordinate format or a compressed sparse row.

17. The non-transitory storage medium of claim 11, further comprising generating time aware graph entity changes based on the time descriptors of the entities and/or the time descriptors of the attributes and/or generating time aware relationship changes based on the time descriptors of the entities and/or the time descriptors of the attributes.

18. The non-transitory storage medium of claim 11, further comprising performing time aware queries based on the time descriptors of the entities and/or the time descriptors of the attributes, wherein the time descriptor in each of the attributes and each of the entities has a same specificity.

* * * * *

UNITED STATES PATENT AND TRADEMARK OFFICE
CERTIFICATE OF CORRECTION

| | | |
|---|---|---|
| PATENT NO. | : 12,386,896 B2 | Page 1 of 1 |
| APPLICATION NO. | : 17/663493 | |
| DATED | : August 12, 2025 | |
| INVENTOR(S) | : Aurelian Dumitru | |

It is certified that error appears in the above-identified patent and that said Letters Patent is hereby corrected as shown below:

In the Specification

Column 4
Line 5, change "The creates the ability" to – This creates the ability –

Column 6
Line 22, change "The training environments allows models" to – The training environments allow models –

Signed and Sealed this
Twenty-third Day of December, 2025

John A. Squires
*Director of the United States Patent and Trademark Office*